(12) United States Patent
Park et al.

(10) Patent No.: US 11,760,818 B2
(45) Date of Patent: Sep. 19, 2023

(54) METHOD OF PREPARING VINYL CHLORIDE-BASED POLYMER

(71) Applicant: LG CHEM, LTD., Seoul (KR)

(72) Inventors: Jae Hyun Park, Daejeon (KR); Hyun Min Lee, Daejeon (KR); Hyun Kyou Ha, Daejeon (KR); Kun Ji Kim, Daejeon (KR); Kwang Jin Lee, Daejeon (KR); Yang Jun Jeon, Daejeon (KR); Jin Hyuck Ju, Daejeon (KR)

(73) Assignee: LG CHEM, LTD., Seoul (KR)

( * ) Notice: Subject to any disclaimer, the term of this patent is extended or adjusted under 35 U.S.C. 154(b) by 479 days.

(21) Appl. No.: 17/265,118

(22) PCT Filed: Oct. 30, 2019

(86) PCT No.: PCT/KR2019/014496
§ 371 (c)(1),
(2) Date: Feb. 1, 2021

(87) PCT Pub. No.: WO2020/091427
PCT Pub. Date: May 7, 2020

(65) Prior Publication Data
US 2021/0317243 A1 Oct. 14, 2021

(30) Foreign Application Priority Data
Nov. 2, 2018 (KR) .......................... 10-2018-0133739

(51) Int. Cl.
*C08F 114/06* (2006.01)
*C08K 3/26* (2006.01)
(52) U.S. Cl.
CPC .............. *C08F 114/06* (2013.01); *C08K 3/26* (2013.01); *C08K 2003/262* (2013.01)

(58) Field of Classification Search
CPC .................................. C08F 114/06; C08K 3/26
USPC .......................................................... 524/787
See application file for complete search history.

(56) References Cited

U.S. PATENT DOCUMENTS

| 5,151,476 | A | 9/1992 | Marshall et al. |
| 6,242,541 | B1 * | 6/2001 | Hohenadel .............. C08F 14/06 526/345 |
| 2002/0173611 | A1 | 11/2002 | Percec et al. |

FOREIGN PATENT DOCUMENTS

| CN | 100368444 C | 2/2008 |
| CN | 101787166 A | 7/2010 |
| CN | 103183759 A | 7/2013 |
| CN | 105440219 A | 3/2016 |
| EP | 0556053 A1 | 8/1993 |
| JP | 2756995 B2 | 5/1998 |
| KR | 10-2016-0058567 A | 5/2016 |
| KR | 10-1721295 B1 | 4/2017 |
| KR | 10-2018-0047361 A | 5/2018 |
| WO | 2013-092730 A1 | 6/2013 |

* cited by examiner

*Primary Examiner* — Deve V Hall
(74) *Attorney, Agent, or Firm* — Bryan Cave Leighton Paisner LLP

(57) ABSTRACT

The present disclosure provides a method of preparing a vinyl chloride-based polymer, and the method provides excellent productivity while having reduced amount of a volatile organic compound generated so as to provide the vinyl chloride-based polymer suitable for an eco-friendly material, and improved foaming and viscosity properties of a plastisol including the prepared polymer, by adding a carbonate-based metal salt and a transition metal catalyst together, and controlling input time and amount of the transition metal catalyst.

9 Claims, No Drawings

METHOD OF PREPARING VINYL CHLORIDE-BASED POLYMER

CROSS-REFERENCE TO RELATED APPLICATIONS

This application is a National Stage Application of International Application No. PCT/KR2019/014496, filed on Oct. 30, 2019 which claims priority to Korean Patent Application No. 10-2018-0133739, filed on Nov. 2, 2018, the disclosures of which are incorporated herein by reference in their entirety.

TECHNICAL FIELD

The present disclosure relates to a method of preparing a vinyl chloride-based polymer in which productivity is improved, an amount of a volatile organic compound generated is reduced, and viscosity and foaming properties of a plastisol including the prepared polymer are improved.

BACKGROUND ART

A vinyl chloride-based polymer is a polymer containing 50 wt % or more of a repeating unit derived from a vinyl chloride monomer (VCM), wherein it has various applications because it is inexpensive, its hardness is easily controlled, and it is applicable to most processing apparatuses. In addition, since the vinyl chloride-based polymer may provide a molded article having excellent physical and chemical properties such as mechanical strength, weather resistance, and chemical resistance, the vinyl chloride-based polymer is being widely used in many fields.

A vinyl chloride-based resin is a general-purpose resin most widely used in the world as life and industrial materials, wherein, typically, a straight vinyl chloride-based resin, as powder particles having a size of about 100 μm to 200 μm, has been prepared by a suspension polymerization method, and a paste vinyl chloride-based resin, as powder particles having a size of about 0.1 μm to 2 μm, has been prepared by an emulsion polymerization method.

With respect to the paste vinyl chloride-based resin, a latex obtained by emulsion polymerization is typically dried by a spray drying method to form final resin particles, and the particles are dispersed in a solvent or a plasticizer and used in products, such as a flooring material, wallpaper, a tarpaulin, a raincoat, gloves, an automotive underbody coating, and carpet tiles, through a process such as coating (reverse roll-coating, knife coating, screen coating, spray coating), gravure and screen printing, rotation casting, and shell casting and dipping.

Particularly, with a recent increasing interest in eco-friendly products with less amount of total volatile organic compound (TVOC), many efforts have been made to minimize the amount of the TVOC in various product groups produced by many companies, and there is a growing demand for products that emphasize the eco-friendliness.

Thus, a significant amount of research has been conducted to reduce a volatile organic compound generated in a molded article produced using the vinyl chloride-based polymer, and research into various additives and plasticizers mainly used as an auxiliary raw material has been conducted.

However, since various regulations for the environment are continuously increasing, substitution of the plasticizer used as the auxiliary raw material has a limitation in reducing a degree of the generation of the volatile organic compound below an appropriate level. Thus, there is a need for a method capable of reducing the volatile organic compound generated from the vinyl chloride-based polymer itself while maintaining effective physical properties of the vinyl chloride-based polymer, but, since reactivity is decreased in a conventional polymerization method, reaction time is increased, and thus, there is a limitation in using the method in actual sites.

PRIOR ART DOCUMENT

Patent Document (Patent Document 1) Korean Patent Application Laid-open Publication No. 10-2016-0058567

DISCLOSURE OF THE INVENTION

Technical Problem

The present disclosure aims at providing a method of preparing a vinyl chloride-based polymer, which provides excellent productivity while having reduced amount of a volatile organic compound generated so as to provide the vinyl chloride-based polymer suitable for an eco-friendly material, and improved foaming and viscosity properties of a plastisol including the prepared polymer, by adding a carbonate-based metal salt and a transition metal catalyst together, and controlling input time and amount of the transition metal catalyst.

Technical Solution

According to an aspect of the present invention, there is provided a method of preparing a vinyl chloride-based polymer which includes: polymerizing a vinyl chloride-based monomer by adding a carbonate-based metal salt in the presence of one or more emulsifiers and a polymerization initiator, wherein, in the polymerizing, a transition metal catalyst is added when a polymerization conversion rate is in a range of 5% to 35%, and the transition metal catalyst is added in an amount of 0.01 ppm to 7.5 ppm based on a weight of the vinyl chloride-based monomer.

Advantageous Effects

In the present disclosure, since a polymerization reaction rate is improved by adding a carbonate-based metal salt and a transition metal catalyst together, and by controlling input time and amount of the transition metal catalyst, an amount of a volatile organic compound generated is reduced while ensuring a high level of productivity, and thus, a vinyl chloride-based polymer suitable for an eco-friendly material and a vinyl chloride-based polymer having foaming and viscosity properties, which are not deteriorated when processed into a plastisol and are equal to or better than those of a conventional polymer in which a metal catalyst is not added, may be prepared.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Definition of Terms

The term "polymer" used in the present specification denotes a polymeric compound prepared by polymerizing monomers, whether they are the same or different species. As such, the generic term "polymer" refers to a polymer prepared from only one type of monomer, wherein it encompasses the term homopolymer commonly used and the term interpolymer as defined below.

The expression "vinyl chloride-based polymer" used in the present specification inclusively represents a compound formed by polymerizing a vinyl chloride-based monomer, wherein it may mean a polymer chain derived from the vinyl chloride-based monomer.

The term "plastisol" used in the present specification denotes a mixture, in which a resin and a plasticizer are mixed so that the mixture may be molded, casted, or processed in the form of a continuous film by heating, and, for example, may denote a paste form in which the vinyl chloride-based polymer and the plasticizer are mixed.

The term "composition" used in the present specification includes a mixture of materials including the corresponding composition as well as reaction and decomposition products formed from a material of the corresponding composition.

In the present specification, an average particle diameter (D50) may be defined as a particle diameter corresponding to 50% of the cumulative number of particles in a particle diameter distribution curve of the particles. The average particle diameter (D50), for example, may be measured by using a laser diffraction method. The laser diffraction method may generally measure a particle diameter ranging from a submicron level to a few mm, and may obtain highly repeatable and high resolution results.

1. Method of Preparing Vinyl Chloride-Based Polymer

An embodiment of the present invention provides a method of preparing a vinyl chloride-based polymer which includes a step of polymerizing a vinyl chloride-based monomer by adding a carbonate-based metal salt in the presence of one or more emulsifiers and a polymerization initiator, wherein, in the polymerizing step, a transition metal catalyst is added when a polymerization conversion rate is in a range of 5% to 35%, and the transition metal catalyst is added in an amount of 0.01 ppm to 7.5 ppm based on a weight of the vinyl chloride-based monomer.

Typically, a sulfonate-based emulsifier and a sulfate-based emulsifier have been most widely used during the preparation of a vinyl chloride-based polymer, and it is known that the sulfate-based emulsifier particularly generates a greater amount of volatile organic compound. Also, the amount of the volatile organic compound generated may also be increased by a polymerization initiator essentially used in a preparation process and a metal catalyst component selectively added. Thus, a technique of reducing the generation of the volatile organic compound is required for the vinyl chloride-based polymer itself, particularly, the vinyl chloride-based polymer prepared by using the sulfate-based emulsifier, but, since there is a significant difference in productivity when a volatile organic compound reducing agent is used, there is a limitation in widely using the volatile organic compound reducing agent commercially.

That is, the volatile organic compound has been reduced by changing a condition in a reactor by adding a material conventionally used as the volatile organic compound reducing agent at an initial stage of reaction, but, in this case, polymerization productivity may be significantly decreased due to reaction time delay. Particularly, in a case in which sodium hydroxide (NaOH), a strong base, is used, the polymerization productivity may not only be decreased, but the formation of a vinyl chloride-based polymer for plastisol processing may also be difficult due to an agglomeration phenomenon, and, in a case in which foam formulation is performed through the plastisol processing, there is a risk of over-foaming, and there is almost no effect of reducing the volatile organic compound.

Thus, as a method of preparing a vinyl chloride-based polymer in which productivity is significantly improved while providing the vinyl chloride-based polymer with less generation of a volatile organic compound as well as excellent viscosity and foaming properties, suggested is a method of preparing a vinyl chloride-based polymer in which a carbonate-based metal salt is used.

Also, since carbonate ions are not present in a material other than the carbonate-based metal salt, for example, the sodium hydroxide, the material may only act as a pH regulator, but may not act as an oxidizing agent and/or a reducing agent, and thus, in a case in which sodium hydroxide is used when applying an oxidation-reduction polymerization (redox polymerization) system to improve productivity, there is a limitation in that other auxiliary raw materials, such as an oxidizing agent and/or a reducing agent, which are capable of allowing the redox system to be sustained by oxidizing and/or reducing transition metal ions, must be included.

In this case, the oxidizing agent and/or reducing agent mainly used in a vinyl chloride-based polymerization process may be a weak acid substance, and, if an excessive amount of the weak acid substance is added to sufficiently oxidize or reduce the metal ions, since pH is reduced during polymerization, the polymerization is performed under acidic conditions, and thus, a decomposition reaction of the initiator having higher reactivity under low pH conditions may be excessive to cause a problem of polymerization reaction runaway and a problem of increase in the amount of the volatile organic compound of the prepared polymer. In a case in which a polymer is prepared under acidic conditions, a problem of significant deterioration in heat resistance of the polymer itself may occur as defect sites in the prepared polymer increase.

Furthermore, in a case in which an acidic substance, such as potassium phosphate, is used as a pH regulator, since the pH in the polymerization reaction is further reduced, the polymerization may also be performed under acidic conditions, the same problems occurred when the oxidizing agent and/or reducing agent were added as described above may occur.

However, in the case that the carbonate-based metal salt is added as in the embodiment of the present invention, since the carbonate-based metal salt may also act as a reducing agent that reduces the metal ions due to carbonate ions, it is advantageous in that there is no need to use an auxiliary raw material, such as a separate reducing agent, and the problems caused by the use of the above-described auxiliary raw materials may be prevented.

Since the carbonate-based metal salt contains carbonate ions, an acidic reducing agent, which is essentially included in a conventional redox polymerization system, may not be included or a trace amount thereof may be included and the amount of the transition metal catalyst may be significantly reduced as a reducing reaction with metal ions of the transition metal catalyst is smooth, and, accordingly, it may prevent the deterioration of physical properties, for example, an increase in viscosity and degradation of foam color, which may occur by including a large amount of the transition metal catalyst. Also, since $CO_3^-$ radicals of the carbonate ions generated by the reduction reaction of the metal ions may decompose the polymerization initiator to further enhance activity of the polymerization initiator and, furthermore, to be able to play a role in donating electrons to structural defects of the vinyl chloride-based polymer prepared, there is an effect of improving the structural defects of the polymer, and thus, the reactivity as well as the viscosity and foaming properties of a plastisol may be simultaneously improved.

In other words, according to an embodiment of the present invention, it is advantageous in that, different from a conventional case, productivity may be significantly improved while not adding the oxidizing agent and/or reducing agent even if the redox polymerization system is applied by using the carbonate-based metal salt (pH regulator) and the transition metal catalyst.

In this case, since the transition metal catalyst, which is used with the carbonate-based metal salt, the pH regulator, to apply the redox polymerization system, affects the polymerization reactivity of the monomer, it overall affects the formation of the polymer, for example, it promotes the formation of fine particles, and thus, it is necessary to appropriately control formulation properties of the plastisol and physical properties of the polymer by controlling input conditions of the transition metal catalyst.

As described above, the carbonate-based metal salt is a material capable of reducing the amount of the volatile organic compound which may be generated in the vinyl chloride-based polymer itself, wherein the transition metal catalyst is added together to improve the reactivity while adding the carbonate-based metal salt during the polymerization, but input time and amount of the transition metal catalyst may be controlled to significantly reduced the amount of the volatile organic compound generated and simultaneously expect a significant improvement in polymerization productivity, an auxiliary raw material, such as a separate reducing agent, is not required even if the redox polymerization system is applied, and there is an effect of improving the viscosity and foaming properties when processed into a plastisol.

Hereinafter, the preparation method according to an embodiment of the present invention will be described in detail.

The method of preparing a vinyl chloride-based polymer according to the embodiment of the present invention includes a step of polymerizing a vinyl chloride-based monomer by adding a carbonate-based metal salt in the presence of one or more emulsifiers and a polymerization initiator, wherein it is a step of forming the vinyl chloride-based monomer into the vinyl chloride-based polymer by initiating a polymerization reaction in a reactor.

Specifically, the polymerization according to an embodiment of the present invention may be performed by adding a carbonate-based metal salt and a vinyl chloride-based monomer to a polymerization reactor filled with polymerization water, a first emulsifier, and a polymerization initiator and performing a polymerization reaction. Also, in the present invention, a second emulsifier may be further added if necessary, and the second emulsifier may be continuously added during the polymerization reaction.

Herein, the polymerization may be preferably performed by an emulsion polymerization method, and may be more preferably performed by a pure emulsion polymerization method.

The polymerization reactor filled with the polymerization water, the first emulsifier, and the polymerization initiator may represent a polymerization reactor containing a mixed solution which includes the polymerization water, the first emulsifier, and the polymerization initiator, and the mixed solution may further include a dispersant, a chain transfer agent, an electrolyte, and a reaction inhibitor in addition to the polymerization water, the first emulsifier, and the polymerization initiator, but the present invention is not limited thereto.

The polymerization initiator may be used in an amount of 0.01 part by weight to 2.0 parts by weight based on 100 parts by weight of the vinyl chloride-based monomer. The polymerization initiator is not particularly limited, but, for example, may include at least one selected from the group consisting of peroxy carbonates, peroxyesters, and azo-based compounds. Specifically, with respect to the polymerization initiator, lauryl peroxide (LPO), di-2-ethylhexyl peroxydicarbonate (OPP), diisopropyl peroxydicarbonate, t-butyl peroxypivalate, t-butyl peroxyneodecanoate, and 2,2-azobisisobutyronitrile may be used alone or in a mixture of two or more thereof.

Also, the polymerization initiator may be a water-soluble initiator. In a case in which the polymerization initiator is a water-soluble initiator, the polymerization initiator is not particularly limited, but, for example, the polymerization initiator may include at least one selected from the group consisting of potassium persulfate, ammonium persulfate, and hydrogen peroxide, the water-soluble initiator may be preferably used as the polymerization initiator in the present invention, and potassium persulfate may specifically be used.

Furthermore, the polymerization water may be used in an amount of 70 parts by weight to 200 parts by weight based on 100 parts by weight of the vinyl chloride-based monomer, and the polymerization water may be deionized water.

Also, the first emulsifier may be used in an amount of 0.005 part by weight to 0.4 part by weight, for example, 0.01 part by weight to 0.4 part by weight based on 100 parts by weight of the vinyl chloride-based monomer, and the second emulsifier may be continuously added during the reaction after the initiation of the polymerization if necessary, and may be used in an amount of 1 part by weight to 15 parts by weight based on 100 parts by weight of the vinyl chloride-based monomer.

In the present invention, the first emulsifier and the second emulsifier may be different materials from each other or may be the same material, and, in a case in which the first emulsifier and the second emulsifier are the same material, the expressions "first" and "second" may be used to distinguish the order of the addition of the emulsifiers.

Specifically, the first emulsifier and the second emulsifier each may be at least one selected from the group consisting of sodium lauryl sulfate, lauryl benzene sulfonic acid, alpha-olefin sulfonate, sodium dodecyl benzene sulfonate, sodium lauryl ethoxylated sulfate, sodium octadecyl sulfate, sodium lauryl ether sulfate, and linear alkylbenzene sulfonate, and the first emulsifier and the second emulsifier may preferably include sodium lauryl sulfate.

Furthermore, the reaction inhibitor is not particularly limited, but, for example, paraquinone, hydroquinone, butylated hydroxytoluene, monomethyl ether hydroquinone, quaternary butyl catechol, diphenylamine, triisopropanolamine, and triethanolamine may be used, and the dispersant is not particularly limited, but, for example, higher alcohols, such as lauryl alcohol, myristic alcohol, and stearyl alcohol, or higher fatty acids, such as lauric acid, myristic acid, palmitic acid, and stearic acid, may be used.

Also, the chain transfer agent is not particularly limited, but, for example, may include n-butyl mercaptan, n-octyl mercaptan, n-dodecyl mercaptan, and t-dodecyl mercaptan, and the electrolyte is not particularly limited, but, for example, may include at least one selected from the group consisting of potassium chloride, sodium chloride, potassium bicarbonate, sodium carbonate, potassium carbonate, potassium hydrogen sulfite, sodium hydrogen sulfite, potassium pyrophosphate, tetrasodium pyrophosphate, tripotassium phosphate, trisodium phosphate, dipotassium hydrogen phosphate, and disodium hydrogen phosphate.

Furthermore, the vinyl chloride-based monomer according to an embodiment of the present invention may denote a vinyl chloride-based monomer alone or a mixture of a vinyl chloride-based monomer and a vinyl-based monomer copolymerizable with the vinyl chloride-based monomer. That is, the vinyl chloride-based polymer according to the embodiment of the present invention may be a vinyl chloride homopolymer or may be a copolymer of a vinyl chloride monomer and a vinyl-based monomer copolymerizable therewith. In a case in which the vinyl chloride-based polymer is the copolymer, vinyl chloride may be included in an amount of 50% or more.

Accordingly, the vinyl chloride-based monomer usable according to the embodiment of the present invention may be a vinyl chloride single material; or may be a mixture of vinyl chloride and a vinyl-based monomer copolymerizable with the vinyl chloride. The vinyl-based monomer is not particularly limited, but may include an olefin compound such as ethylene, propylene, and butene, vinyl esters such as vinyl acetate, vinyl propionate, and vinyl stearate, unsaturated nitriles such as acrylonitrile, vinyl alkyl ethers such as vinyl methyl ether, vinyl ethyl ether, vinyl octyl ether, and vinyl lauryl ether, halogenated vinylidenes such as vinylidene chloride, an unsaturated fatty acid such as acrylic acid, methacrylic acid, itaconic acid, maleic acid, fumaric acid, maleic anhydride, and itaconic anhydride, and anhydrides of these fatty acids, unsaturated fatty acid esters such as methyl acrylate, ethyl acrylate, monomethyl maleate, dimethyl maleate, and butyl benzyl maleate, and a cross-linkable monomer such as diallyl phthalate, and any one thereof or a mixture of two or more thereof may be used.

Also, according to an embodiment of the present invention, a homogenization process may be performed on the mixed solution of the polymerization water, the polymerization initiator, the first emulsifier, and the vinyl chloride-based monomer, which are filled in the polymerization reactor, before the initiation of the polymerization reaction in the present invention, if necessary. The homogenization may be performed by homogenizing for 1 hour to 3 hours using a homogenizer at a temperature of 30° C. or less, particularly at a temperature of 5° C. to 25° C. In this case, the homogenizer is not particularly limited, but a conventional homogenizer known in the art may be used, and, for example, a rotor-stator type homogenizer may be used.

According to an embodiment of the present invention, the carbonate-based metal salt may be added in an amount of 100 ppm to 1,500 ppm, for example, 600 ppm to 1,000 ppm based on a total weight of the vinyl chloride-based monomer. In a case in which the amount of the carbonate-based metal salt is added within the above range, an effect of improving reactivity may be maximized when the carbonate-based metal salt is used with an appropriate amount of the metal catalyst, and the amount of the volatile organic compound generated may be significantly reduced at the same time.

According to an embodiment of the present invention, the carbonate-based metal salt is not particularly limited as long as it contains carbonate ions ($CO_3^{2-}$), but, in terms of improving reactivity, the carbonate-based metal salt may preferably include at least one selected from the group consisting of sodium carbonate ($Na_2CO_3$), sodium hydrogen carbonate ($NaHCO_3$), magnesium carbonate ($MgCO_3$), calcium carbonate ($CaCO_3$), and potassium carbonate ($K_2CO_3$), and may more preferably include sodium carbonate, sodium hydrogen carbonate, potassium carbonate, or a mixture thereof.

According to an embodiment of the present invention, the carbonate-based metal salt may act as a pH regulator capable of adjusting pH during the polymerization process, and may also act as a reducing agent at the same time when the redox polymerization system is applied as described above.

In a case in which a strong basic substance, such as sodium hydroxide generally used, is used as the pH regulator, there is no effect of reducing the amount of the volatile organic compound generated as described above, and, even if some improvement is made, productivity is significantly reduced or there is a risk of over-foaming when foam formulation is performed through the plastisol processing. In a case in which an acidic substance, such as potassium phosphate, is used as the pH regulator, since the amount of the volatile organic compound generated is significantly increased relative to a degree of productivity improvement, it has a serious problem such as not applicable to an eco-friendly product. Thus, it is desirable to use the carbonate-based metal salt in order to achieve all effects of the reduction of the amount of the volatile organic compound generated, the improvement in the viscosity and foaming properties of the polymer, and the productivity improvement.

As described above, in a case in which the transition metal catalyst is appropriately controlled and added during the polymerization while adding the carbonate-based metal salt, it is possible to achieve all the effects, such as the productivity improvement and the reduction of the amount of the volatile organic compound generated, by solving the above-described existing problems, the plastisol using the same has excellent processability due to excellent viscosity characteristics, and the processed vinyl chloride-based polymer may have excellent foaming performance or heat resistance.

Furthermore, the method of preparing a vinyl chloride-based polymer according to the embodiment of the present invention includes adding a transition metal catalyst when a polymerization conversion rate is in a range of 5% to 35%, wherein, since a decrease in reaction rate due to the use of the carbonate-based metal salt is improved by adding the transition metal catalyst during the polymerization, excellent productivity may be ensured.

According to an embodiment of the present invention, the transition metal catalyst is added when the polymerization conversion rate is in a range of 5% to 35%, and, in terms of the productivity improvement and the improvement of the viscosity and foaming properties of the polymer, the transition metal catalyst may preferably be added when the polymerization conversion rate is in a range of 10% to 30% and may more preferably be added when the polymerization conversion rate is in a range of 15% to 25%. In a case in which the transition metal catalyst is added when the polymerization conversion rate is less than 5%, the reactivity may be improved, but, since the formation of the fine particles is promoted at the initial stage of the reaction, viscosity characteristics of the finally prepared polymer may be degraded. In a case in which the transition metal catalyst is added when the polymerization conversion rate is greater than 35%, since an effect of activating the formation of polymer particles at the initial stage of the reaction is reduced, an effect of shortening reaction time is insignificant, and thus, an increase in the productivity may not be expected.

Also, a method of adding the transition metal catalyst is not limited, and the method of adding the transition metal catalyst may be appropriately selected from batch addition, continuous addition, and divided addition methods and may be used according to physical properties of the polymer to be prepared, wherein the effects desired in the present invention may be sufficiently achieved even in a case where the continuous or divided addition method is used, but the batch addition method is preferable in terms of the productivity improvement of the polymer to be prepared.

According to an embodiment of the present invention, the transition metal catalyst may be added in an amount of 0.01 ppm to 7.5 ppm, preferably 0.03 ppm to 6.0 ppm, and more preferably 0.05 ppm to 5.0 ppm based on the total weight of the vinyl chloride-based monomer. The transition metal catalyst is a material capable of improving reactivity by promoting the activity of the initiator, wherein the reactivity may be improved even with a relatively small amount of the initiator when the amount of the transition metal catalyst is large, but, in a case in which the transition metal catalyst is excessively included in an amount of greater than 7.5 ppm, the viscosity may be increased due to the promotion of fine particle formation, and foaming properties may be deteriorated because foam color significantly degrades due to the metal catalyst remaining after the polymerization. In a case in which the amount of the transition metal catalyst added is 0.01 ppm or less, since the addition amount is excessively small, the effect of the productivity improvement may not be obtained.

Furthermore, since the carbonate-based metal salt is used in the redox polymerization system, the present invention has an effect in which the reactivity may be improved to an excellent level even if a small amount of the transition metal catalyst is used.

The transition metal catalyst according to an embodiment of the present invention is not limited as long as it is a transition metal compound used in the preparation of the vinyl chloride-based polymer, and the transition metal catalyst may specifically include copper sulfate, iron sulfate, or a mixture thereof. The copper sulfate may include copper(I) sulfate ($Cu_2SO_4$), copper(II) sulfate ($CuSO_4$), or a mixture thereof, and the iron sulfate may include iron(II) sulfate ($FeSO_4$), iron(III) sulfate ($Fe_2(SO_4)_3$), or a mixture thereof.

The reaction may be performed by further adding additives, for example, 0.5 part by weight to 2.0 parts by weight of the electrolyte, 0.1 part by weight to 2.0 parts by weight of the chain transfer agent, and a reaction inhibitor, based on 100 parts by weight of the vinyl chloride-based monomer, if necessary.

The polymerization performed according to an embodiment of the present invention may be terminated when a pressure in the reactor is in a range of 3.0 $kgf/cm^2$ to 5.0 $kgf/cm^2$.

Also, according to the present invention, a step of recovering and drying the prepared vinyl chloride-based polymer in the form of a latex may be further included, wherein the drying is not particularly limited in this case and may be performed by a method known in the art, and the drying may specifically be performed according to a spray-drying method. A step of dehydration and washing may be further included before the drying.

2. Vinyl Chloride-Based Polymer and Plastisol

The present disclosure provides a vinyl chloride-based polymer prepared by the above preparation method and a plastisol including a plasticizer.

The vinyl chloride-based polymer according to the present disclosure is prepared by the above preparation method, wherein, since it is a vinyl chloride-based polymer with a considerably small amount of the volatile organic compound generated, a performance of the polymer may be equal to or better than that of a conventional vinyl chloride-based polymer.

The vinyl chloride-based polymer according to the present disclosure, for example, may be a paste vinyl chloride-based polymer.

The plastisol according to an embodiment of the present invention may further include 40 parts by weight to 180 parts by weight, 80 parts by weight to 160 parts by weight, or 100 parts by weight to 140 parts by weight of a plasticizer based on 100 parts by weight of the vinyl chloride-based polymer, and may further include an additive, such as a dispersion diluent, a heat stabilizer, a viscosity modifier, and a foaming agent, if necessary.

The expression "plasticizer" in the present disclosure may denote an organic additive material which plays a role in improving high-temperature moldability of a thermoplastic resin by being added to the resin to increase thermoplasticity.

Those known in the art may be used as the plasticizer and the additive.

Since the plastisol according to the embodiment of the present invention has excellent viscosity characteristics by including the vinyl chloride-based polymer prepared by the above preparation method, the plastisol may have excellent processability as well as excellent other performance characteristics and foaming properties.

Hereinafter, the present invention will be described in more detail, according to specific examples. However, the following examples are merely presented to exemplify the present invention, and the scope of the present invention is not limited thereto.

Example 1

185 kg of polymerization water, 40 g of a primary emulsifier (sodium lauryl sulfate), 110 g of a water-soluble initiator (potassium persulfate, KPS), and 150 g of potassium carbonate ($K_2CO_3$) were added to a 500 L high-pressure reactor and the reactor was then evacuated while stirring. 185 kg of a vinyl chloride monomer was added to the reactor in a vacuum state and the temperature of the reactor was then increased to 50° C. to perform polymerization. When the polymerization reaction started, 18 kg of a secondary emulsifier (sodium lauryl sulfate) was continuously added to the reactor for 5 hours. Copper sulfate ($CuSO_4$) was added in an amount of 0.05 ppm based on a weight of the vinyl chloride monomer when a polymerization conversion rate was 20%, and the reaction was continued. The reaction was terminated when a pressure of the reactor reached 4.0 $kgf/cm^2$ and the unreacted vinyl chloride monomer was recovered and removed to prepare a vinyl chloride polymer latex. A solid vinyl chloride polymer was prepared by spray drying the vinyl chloride polymer latex.

Example 2

A vinyl chloride polymer was prepared in the same manner as in Example 1 except that copper sulfate was added in an amount of 5 ppm based on the weight of the vinyl chloride monomer when the polymerization conversion rate was 20% in Example 1.

Example 3

A vinyl chloride polymer was prepared in the same manner as in Example 1 except that sodium hydrogen carbonate ($NaHCO_3$) was added instead of the potassium carbonate in Example 1.

Example 4

A vinyl chloride polymer was prepared in the same manner as in Example 3 except that copper sulfate was added in an amount of 5 ppm based on the weight of the vinyl chloride monomer when the polymerization conversion rate was 20% in Example 3.

Example 5

A vinyl chloride polymer was prepared in the same manner as in Example 1 except that sodium carbonate ($Na_2CO_3$) was added instead of the potassium carbonate in Example 1.

Example 6

A vinyl chloride polymer was prepared in the same manner as in Example 5 except that copper sulfate was added in an amount of 5 ppm based on the weight of the vinyl chloride monomer when the polymerization conversion rate was 20% in Example 5.

Example 7

A vinyl chloride polymer was prepared in the same manner as in Example 1 except that copper sulfate was added when the polymerization conversion rate was 10% in Example 1.

Example 8

A vinyl chloride polymer was prepared in the same manner as in Example 1 except that copper sulfate was added when the polymerization conversion rate was 10% in Example 3.

Example 9

A vinyl chloride polymer was prepared in the same manner as in Example 1 except that copper sulfate was added when the polymerization conversion rate was 10% in Example 5.

Comparative Example 1

A vinyl chloride polymer was prepared in the same manner as in Example 1 except that the copper sulfate and the sodium carbonate were not added in Example 1.

Comparative Example 2

A vinyl chloride polymer was prepared in the same manner as in Example 1 except that the copper sulfate was not added in Example 1.

Comparative Example 3

A vinyl chloride polymer was prepared in the same manner as in Example 3 except that the copper sulfate was not added in Example 3.

Comparative Example 4

A vinyl chloride polymer was prepared in the same manner as in Example 5 except that the copper sulfate was not added in Example 5.

Comparative Example 5

A vinyl chloride polymer was prepared in the same manner as in Example 1 except that copper sulfate was added together when the potassium carbonate was added at an initial stage of the polymerization (conversion rate of 0%) in Example 1.

Comparative Example 6

A vinyl chloride polymer was prepared in the same manner as in Example 3 except that copper sulfate was added together when the sodium hydrogen carbonate was added at an initial stage of the polymerization (conversion rate of 0%) in Example 3.

Comparative Example 7

A vinyl chloride polymer was prepared in the same manner as in Example 5 except that copper sulfate was added together when the sodium carbonate was added at an initial stage of the polymerization (conversion rate of 0%) in Example 5.

Comparative Example 8

A vinyl chloride polymer was prepared in the same manner as in Example 1 except that copper sulfate was added in an amount of 10 ppm based on the weight of the vinyl chloride monomer in Example 1.

Comparative Example 9

A vinyl chloride polymer was prepared in the same manner as in Example 3 except that copper sulfate was added in an amount of 10 ppm based on the weight of the vinyl chloride monomer in Example 3.

Comparative Example 10

A vinyl chloride polymer was prepared in the same manner as in Example 5 except that copper sulfate was added in an amount of 10 ppm based on the weight of the vinyl chloride monomer in Example 5.

Comparative Example 11

A vinyl chloride polymer was prepared in the same manner as in Example 2 except that copper sulfate was added when the polymerization conversion rate was 50% in Example 2.

Comparative Example 12

A vinyl chloride polymer was prepared in the same manner as in Example 4 except that copper sulfate was added when the polymerization conversion rate was 50% in Example 4.

Comparative Example 13

A vinyl chloride polymer was prepared in the same manner as in Example 6 except that copper sulfate was added when the polymerization conversion rate was 50% in Example 6.

Comparative Example 14

A vinyl chloride polymer was prepared in the same manner as in Example 1 except that copper sulfate was continuously added from the initial stage of the polymerization (conversion rate of 0%) until when the polymerization conversion rate was 80% in Example 1.

Comparative Example 15

A vinyl chloride polymer was prepared in the same manner as in Example 2 except that copper sulfate was continuously added from the initial stage of the polymerization (conversion rate of 0%) until when the polymerization conversion rate was 80% in Example 2.

Comparative Example 16

A vinyl chloride polymer was prepared in the same manner as in Example 3 except that copper sulfate was continuously added from the initial stage of the polymerization (conversion rate of 0%) until when the polymerization conversion rate was 80% in Example 3.

Comparative Example 17

A vinyl chloride polymer was prepared in the same manner as in Example 4 except that copper sulfate was continuously added from the initial stage of the polymerization (conversion rate of 0%) until when the polymerization conversion rate was 80% in Example 4.

Comparative Example 18

A vinyl chloride polymer was prepared in the same manner as in Example 5 except that copper sulfate was continuously added from the initial stage of the polymerization (conversion rate of 0%) until when the polymerization conversion rate was 80% in Example 5.

Comparative Example 19

A vinyl chloride polymer was prepared in the same manner as in Example 6 except that copper sulfate was continuously added from the initial stage of the polymerization (conversion rate of 0%) until when the polymerization conversion rate was 80% in Example 6.

Comparative Example 20

A vinyl chloride polymer was prepared in the same manner as in Example 1 except that 17 g of sodium hydroxide (NaOH) was added instead of the potassium carbonate in Example 1.

Comparative Example 21

A vinyl chloride polymer was prepared in the same manner as in Example 2 except that 17 g of sodium hydroxide (NaOH) was added instead of the potassium carbonate in Example 2.

Table 1 below shows the pH regulators and input conditions of the copper sulfate in Examples 1 to 9 and Comparative Examples 1 to 21.

TABLE 1

| | | Type of carbonate-based metal salt | Input method | Input time (conversion rate, %) | Input amount (ppm) |
|---|---|---|---|---|---|
| Example | 1 | Potassium carbonate ($K_2CO_3$) | Batch | 20 | 0.05 |
| | 2 | Potassium carbonate ($K_2CO_3$) | Batch | 20 | 5 |
| | 3 | Sodium hydrogen carbonate ($NaHCO_3$) | Batch | 20 | 0.05 |
| | 4 | Sodium hydrogen carbonate ($NaHCO_3$) | Batch | 20 | 5 |
| | 5 | Sodium carbonate ($Na_2CO_3$) | Batch | 20 | 0.05 |
| | 6 | Sodium carbonate ($Na_2CO_3$) | Batch | 20 | 5 |
| | 7 | Potassium carbonate ($K_2CO_3$) | Batch | 10 | 0.05 |
| | 8 | Sodium hydrogen carbonate ($NaHCO_3$) | Batch | 10 | 0.05 |
| | 9 | Sodium carbonate ($Na_2CO_3$) | Batch | 10 | 0.05 |
| Comparative Example | 1 | — | — | — | — |
| | 2 | Potassium carbonate ($K_2CO_3$) | — | — | — |
| | 3 | Sodium hydrogen carbonate ($NaHCO_3$) | — | — | — |
| | 4 | Sodium carbonate ($Na_2CO_3$) | — | — | — |
| | 5 | Potassium carbonate ($K_2CO_3$) | Batch | 0 | 0.05 |
| | 6 | Sodium hydrogen carbonate ($NaHCO_3$) | Batch | 0 | 0.05 |
| | 7 | Sodium carbonate ($Na_2CO_3$) | Batch | 0 | 0.05 |
| | 8 | Potassium carbonate ($K_2CO_3$) | Batch | 20 | 10 |
| | 9 | Sodium hydrogen carbonate ($NaHCO_3$) | Batch | 20 | 10 |
| | 10 | Sodium carbonate ($Na_2CO_3$) | Batch | 20 | 10 |
| | 11 | Potassium carbonate ($K_2CO_3$) | Batch | 50 | 5 |
| | 12 | Sodium hydrogen | Batch | 50 | 5 |

TABLE 1-continued

| | Type of carbonate-based metal salt | Input method | Input conditions of CuSO$_4$ | | |
|---|---|---|---|---|---|
| | | | Input time (conversion rate, %) | Input amount (ppm) | |
| | carbonate (NaHCO$_3$) | | | | |
| 13 | Sodium carbonate (Na$_2$CO$_3$) | Batch | 50 | 5 | |
| 14 | Potassium carbonate (K$_2$CO$_3$) | Continuous | 0~80 | 0.05 | |
| 15 | Potassium carbonate (K$_2$CO$_3$) | Continuous | 0~80 | 5 | |
| 16 | Sodium hydrogen carbonate (NaHCO$_3$) | Continuous | 0~80 | 0.05 | |
| 17 | Sodium hydrogen carbonate (NaHCO$_3$) | Continuous | 0~80 | 5 | |
| 18 | Sodium carbonate (Na$_2$CO$_3$) | Continuous | 0~80 | 0.05 | |
| 19 | Sodium carbonate (Na$_2$CO$_3$) | Continuous | 0~80 | 5 | |
| 20 | Sodium hydroxide (NaOH) | Batch | 20 | 0.05 | |
| 21 | Sodium hydroxide (NaOH) | Batch | 20 | 5 | |

Experimental Example 1

1) Polymerization Time Measurement

Polymerization time until when the pressure of the reactor reached 4.0 kgf/cm$^2$ to terminate the reaction was measured and presented in Table 2 below.

2) TSC (%) Measurement 1.5 g of each vinyl chloride polymer latex (before drying) prepared in the examples and the comparative examples was placed on a MX-50 moisture analyzer (A&D Co., Ltd.), and a total solid content (TSC) was measured at 150° C. after 30 minutes and presented in Table 2 below.

3) Volatile Weight Loss Measurement

Volatile weight loss was measured according to DIN 75-201B using a fogging tester (Horizon-FTS, Thermo Fischer Scientific Inc.). After the fogging tester (Horizon-FTS, Thermo Fischer Scientific Inc.) was set to 100° C., a weight of an empty foil was measured and recorded. Thereafter, 10 g of each vinyl chloride polymer sample prepared in the examples and the comparative examples in an empty beaker was weighed and put in a cylinder and a sealing process of covering a top end of the cylinder with an aluminum foil was performed. Thereafter, the cylinder was heated at 100° C. for 16 hours, the foil was taken out to measure its weight after 4 hours, a value obtained by subtracting the measured weight of the sample after the heat treatment from the weight of the initial sample was then represented as the volatile weight loss, and the results thereof are presented in Table 2 below. The higher the volatile weight loss means the greater the amount of the volatile organic compound in the prepared polymer.

Experimental Example 2

1) Viscosity Measurement

After 100 g of each vinyl chloride polymer prepared in the examples and the comparative examples and 66.7 g of diisononyl phthalate (DINP) were mixed at 800 rpm for 10 minutes with an EUROSTAR IKA-WERKE mixer to prepare each plastisol, viscosity was measured using a rheometer (AR2000EX peltier plate, TA Instruments) with a 40 mm parallel plate fixture and a gap of 500 μm and the results thereof are presented in Table 2 below.

2) Foaming Properties Measurement 100 g of each vinyl chloride polymer prepared in the examples and the comparative examples, 80 g of di(2-propylheptyl) phthalate (DPHP), 3 g of a Ba/Zn stabilizer, and 3 g of an acrylonitrile-based foaming agent were mixed at 800 rpm for 10 minutes with an EUROSTAR IKA-WERKE mixer to prepare each plastisol, the prepared plastisol was applied on release paper and coated with a 0.5 mm rod, a pregelling sheet was then prepared at 150° C. for 45 seconds using a Mathis oven, and gelation was performed at 200° C. for 90 seconds to prepare a foam sheet. White index of the prepared foam sheet was measured according to ASTM E 313-73 using a spectrophotometer (CM-700d) and presented in Table 2 below. The higher the measured white index was, the better the thermal stability was, and the good thermal stability means good foaming properties such as foam color quality.

TABLE 2

| | | Polymerization time | TSC (%) | Viscosity (pa · s) | Volatile weight loss (mg) | Foam color |
|---|---|---|---|---|---|---|
| Example | 1 | 8 h 40 m | 42.9 | 109 | 0.30 | 42.7 |
| | 2 | 7 h 25 m | 42.8 | 126 | 0.31 | 39.4 |
| | 3 | 8 h 55 m | 42.6 | 127 | 0.37 | 43.8 |
| | 4 | 7 h 00 m | 42.9 | 118 | 0.36 | 40.2 |
| | 5 | 9 h 10 m | 42.7 | 120 | 0.25 | 45.1 |
| | 6 | 7 h 15 m | 43.0 | 132 | 0.28 | 42.3 |
| | 7 | 8 h 08 m | 43.1 | 135 | 0.29 | 42.6 |
| | 8 | 7 h 55 m | 42.8 | 131 | 0.36 | 43.3 |
| | 9 | 8 h 25 m | 42.2 | 128 | 0.28 | 45.0 |
| Comparative Example | 1 | 10 h 05 m | 42.1 | 184 | 1.20 | 37.0 |
| | 2 | 12 h 45 m | 38.9 | 145 | 0.34 | 39.1 |
| | 3 | 12 h 00 m | 40.9 | 154 | 0.41 | 39.8 |
| | 4 | 13 h 10 m | 39.2 | 137 | 0.31 | 38.9 |
| | 5 | 6 h 25 m | 42.9 | 302 | 0.34 | 38.8 |
| | 6 | 5 h 45 m | 42.4 | 367 | 0.39 | 40.1 |
| | 7 | 5 h 55 m | 42.5 | 415 | 0.31 | 40.9 |
| | 8 | 4 h 43 m | 44.7 | 206 | 0.42 | 20.7 |
| | 9 | 4 h 13 m | 45.0 | 234 | 0.49 | 18.9 |
| | 10 | 5 h 00 m | 44.2 | 218 | 0.5 | 17.3 |
| | 11 | 10 h 47 m | 41.1 | 139 | 0.33 | 40.3 |
| | 12 | 11 h 13 m | 40.6 | 148 | 0.31 | 40.5 |
| | 13 | 11 h 21 m | 40.0 | 141 | 0.27 | 41.1 |
| | 14 | 11 h 33 m | 39.5 | 133 | 0.23 | 40.8 |
| | 15 | 7 h 05 m | 42.3 | 297 | 0.26 | 41.0 |
| | 16 | 11 h 19 m | 40.5 | 138 | 0.26 | 40.5 |
| | 17 | 6 h 57 m | 41.4 | 344 | 0.26 | 39.8 |
| | 18 | 12 h 25 m | 39.7 | 141 | 0.22 | 42.1 |
| | 19 | 7 h 24 m | 41.9 | 315 | 0.21 | 41.9 |
| | 20 | 12 h 35 m | 41.1 | 154 | 0.87 | 40.8 |
| | 21 | 12 m 40 m | 40.8 | 139 | 0.91 | 40.6 |

As illustrated in Table 2, with respect to Examples 1 to 9 according to the present invention in which the vinyl chloride polymers were prepared by adding the carbonate-based metal salt and adding the transition metal catalyst in an amount of 0.01 ppm to 7.5 ppm based on the weight of the monomer when the conversion rate was in a range of 5% to 35%, it may be confirmed that the viscosity and foam color were improved while obtaining the vinyl chloride polymers with less volatile weight loss and the productivity was further improved at the same time in comparison to Comparative Examples 1 to 21 which failed to meet one or more conditions.

Specifically, with respect to Comparative Examples 2 to 4 in which the transition metal catalyst was not used while adding the carbonate-based metal salt, the vinyl chloride polymers with less volatile weight loss may be prepared, but, since decomposition activity of the initiator was reduced due to a change in pH at the initial stage of the polymerization, it may be confirmed that polymerization time was significantly delayed in comparison to that of Comparative Example 1, in which the pH regulator was not used, as well as the examples, and the viscosities and foam colors of the plastisols using the prepared polymers were also degraded.

Also, with respect to Comparative Examples 5 to 7 in which the transition metal catalyst was added with the carbonate-based metal salt at an initial stage of the reaction, polymerization time was reduced, but, since the presence of the transition metal catalyst affects droplet stability of the monomer at the initial stage of the reaction to promote the formation of fine particles, foam colors of the plastisols using the prepared polymers were degraded and particularly, viscosity properties were significantly degraded, for example, viscosities were excessively increased, and thus, it may be confirmed that it was not possible to industrially use the polymers of Comparative Examples 5 to 7.

Furthermore, with respect to Comparative Examples 8 to 10 in which the transition metal catalyst was excessively added in an amount of 10 ppm based on the weight of the monomer, it may be confirmed that the amount of the volatile organic compound in the polymers was large due to high volatile weight loss of the prepared polymers, viscosity properties were deteriorated because viscosities of the plastisols using the polymers were increased by about twice or more than those of the examples, and particularly, quality was degraded during the preparation of molded articles because foam colors were significantly degraded. Thus, it may be confirmed that it was also not possible to industrially use the polymers of Comparative Examples 8 to 10.

Also, with respect to Comparative Examples 11 to 13 in which the input time of the transition metal catalyst was outside the range according to the embodiment of the present invention, since more than half of the monomer had been stabilized by forming the polymer, it may not have an effect of promoting the formation of particles initially. Thus, there was almost no effect of productivity improvement, it was similar to Comparative Example 1 in which nothing was added, and it may be confirmed that Comparative Examples 11 to 13 had plastisol properties similar to those of Comparative Examples 2 to 4 without the addition of the transition metal, because the physical properties of the polymers were also not affected.

Furthermore, with respect to Comparative Examples 14 to 19 in which the input time was outside the specific input time of the transition metal catalyst and continuous addition was performed according to the embodiment of the present invention, since Comparative Examples 14 to 19 almost did not have the effect according to the addition of the transition metal catalyst due to the very small amount of the transition metal catalyst added per unit time, an effect of productivity improvement and an effect of improving formulation properties may not be achieved, or, in a case in which a sufficient amount of the transition metal catalyst was added such that the effect of the productivity improvement may be obtained, since a starting point of the continuous addition was earlier than the specific time point in the present invention, it may be confirmed that Comparative Examples 14 to 19 had the same problem as Comparative Examples 5 to 7 in which the transition metal catalyst was added from the initial stage of the reaction.

Also, with respect to Comparative Examples 20 and 21 in which the carbonate-based metal salt according to the embodiment of the present invention was not added but sodium hydroxide was added, the sodium hydroxide must be added in a small amount in order to prevent an agglomeration phenomenon, which may occur due to an abrupt change in pH, and obtain a normal polymer, and, in this case, it may be confirmed that there was no effect of the productivity improvement. Particularly, since the sodium hydroxide did not act to reduce the volatile weight loss, it may be confirmed that the volatile weight losses were lower than those of the examples.

In the present invention, since the transition metal catalyst was added while preparing the eco-friendly vinyl chloride polymers with low volatile weight loss by using the carbonate-based metal salt, as a pH regulator, in Examples 1 to 9 and the input time and amount of the transition metal catalyst were controlled, it may be confirmed that productivity was improved and, simultaneously, formulation properties, such as viscosity characteristics and foaming properties, of the plastisol may be improved to an excellent level.

The invention claimed is:

1. A method of preparing a vinyl chloride-based polymer, the method comprising:
    polymerizing a vinyl chloride-based monomer by adding a carbonate-based metal salt in the presence of one or more emulsifiers and a polymerization initiator,
    wherein a transition metal catalyst is added when a polymerization conversion rate is in a range of 5% to 35% in the step of polymerizing the vinyl chloride-based monomer, and
    the transition metal catalyst is added in an amount of 0.01 ppm to 7.5 ppm based on the weight of the vinyl chloride-based monomer.

2. The method of claim 1, wherein the carbonate-based metal salt comprises at least one selected from the group consisting of sodium carbonate ($Na_2CO_3$), sodium hydrogen carbonate ($NaHCO_3$), magnesium carbonate ($MgCO_3$), calcium carbonate ($CaCO_3$), and potassium carbonate ($K_2CO_3$).

3. The method of claim 1, wherein the transition metal catalyst is added when the polymerization conversion rate is in a range of 10% to 30%.

4. The method of claim 1, wherein the transition metal catalyst is added by a batch addition method.

5. The method of claim 1, wherein the transition metal catalyst is added in an amount of 0.03 ppm to 6.0 ppm based on the weight of the vinyl chloride-based monomer.

6. The method of claim 1, wherein the transition metal catalyst comprises at least one selected from copper sulfate and iron sulfate.

7. The method of claim 1, wherein the carbonate-based metal salt is added in an amount of 100 ppm to 1,500 ppm based on the weight of the vinyl chloride-based monomer.

8. The method of claim 1, wherein the polymerization is performed by an emulsion polymerization method.

9. The method of claim 1, wherein an oxidizing agent and a reducing agent are not added in the step of polymerizing the vinyl chloride-based monomer.

* * * * *